Dec. 7, 1926.
M. F. SCHWORM
TORCH HEAD FOR OXYACETYLENE TORCHES
Filed Nov. 4, 1922
1,610,170
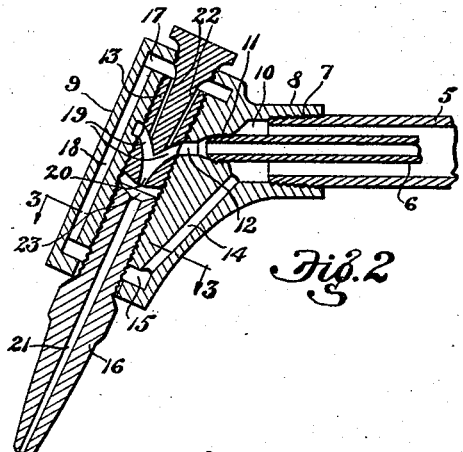
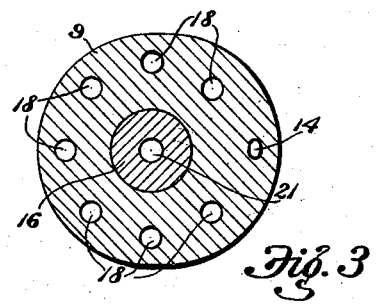
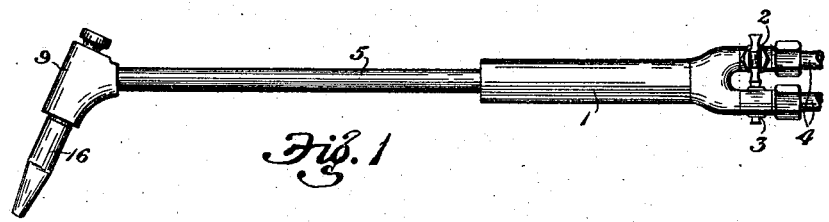
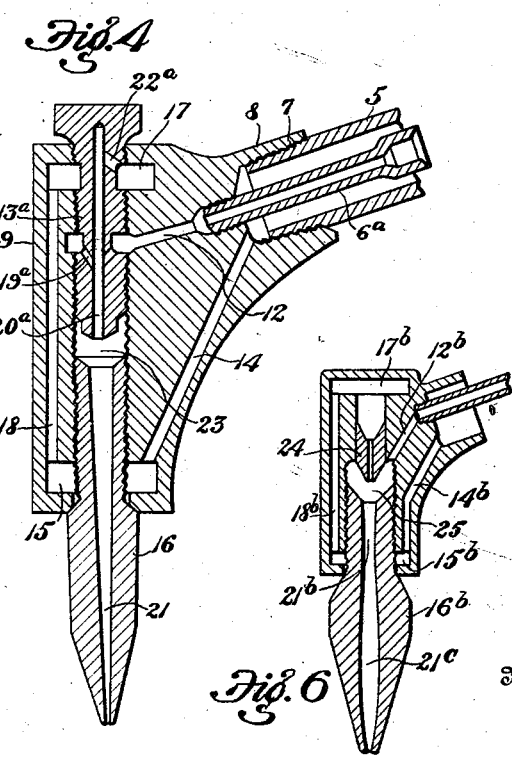
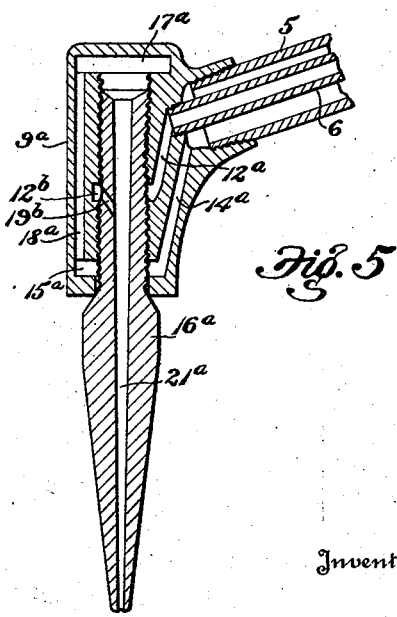
Inventor
M. F. Schworm
By Fream and Bond
Attorneys Patented Dec. 7, 1926.

1,610,170

UNITED STATES PATENT OFFICE.

MELVILLE F. SCHWORM, OF MASSILLON, OHIO.

TORCH HEAD FOR OXYACETYLENE TORCHES.

Application filed November 4, 1922. Serial No. 599,064.

This invention relates to oxy-acetylene welding torches and has for its objects to provide a torch of this character in which the oxygen and acetylene are conveyed separately to the head of the torch, the acetylene being passed directly to the mixing chamber, while the oxygen is carried around the head through a plurality of passages surrounding the mixing chamber and the tip for the purpose of cooling the tip and head and preheating the oxygen before the same is admitted to the mixing chamber.

The above and other objects may be attained by constructing the torch in the manner illustrated in the accompanying drawing, the head of the torch containing the mixing chamber and the tip, a chamber being formed in the lower end of the head surrounding the tip and communicating with the oxygen inlet and through a plurality of passages with a similar chamber in the upper end of the head, which communicates with the mixing chamber.

Preferred embodiments of the invention are illustrated in the accompanying drawing, in which—

Figure 1 is a side elevation of a torch constructed in accordance with the invention;

Fig. 2, an enlarged sectional view through the head of the torch;

Fig. 3, an enlarged section on the line 3—3, Fig. 2; and

Figs. 4, 5 and 6, views similar to Fig. 2 of slightly modified forms of the invention.

Similar numerals of reference indicate corresponding parts throughout the drawing.

The handle of the torch is indicated at 1 and is connected with the oxygen and acetylene valves 2 and 3 respectively, which communicate with suitable sources of supply of the respective gases through the flexible tubes 4. The oxygen valve 2 is connected with the enlarged oxygen tube 5, the acetylene valve 3 being connected with the smaller acetylene tube 6 which is located within the oxygen tube.

The oxygen tube 5 is threaded at its outer end as at 7 and engages the internally threaded neck 8 of the torch head 9, communicating with the enlarged chamber 10 therein, while the acetylene tube 6 is threaded at its outer end as at 11 and engages the internally threaded portion of the reduced passage 12 in the head, which communicates with the mixer 13, which is located axially within the head.

A passage 14 connects the chamber 10 with an annular chamber 15 in the lower end of the head surrounding the tip 16, said annular chamber being connected to a similar chamber 17 surrounding the upper portion of the mixer by means of a plurality of longitudinal passages 18 located around the head and surrounding the tip and mixer.

The mixer 13 shown in Fig. 2, is provided with a plurality of downwardly inclined passages 19 communicating with the acetylene passage 12 and terminating in the single passage 20 which is in alinement with the longitudinal passage 21 of the tip. A plurality of reduced passages 22, in the mixer, provide communication between the annular chamber 17 in the head and the inclined passages 19 of the mixer.

The acetylene passes through the tube 6 and directly into the mixer, while the oxygen passes from the tube 5 down through the passage 14 to the chamber 15 and thence upward through the passages 18 to the chamber 17, and then into the mixer, the two gases being mixed together as they pass through the mixer, the mixture expanding in the expansion chamber 23 and then being carried through the central passage 21 of the tip to the flame.

It will thus be seen that the oxygen passing entirely around the head through channels surrounding the tip and mixer, will maintain the mixture at a low temperature, preventing the acetylene from becoming overheated and decomposing, while at the same time, the oxygen is preheated as it passes around the head, thus reducing the liability of filling the flame with cold oxygen, the heated oxygen producing a much hotter and better flame.

An adaptation of the invention to the equal pressure type of torch is illustrated in Fig. 4, in which the oxygen tube is connected with the head in the same manner as above described, both of said parts being substantially the same in construction as shown in Fig. 2. The acetylene enters the head through the tube 6ª and passes through the inclined passage 19ª in the mixer 13ª to the central passage 20ª, while the oxygen passes around the head, in the manner above described, to the chamber 17 and then upward through the inclined passage 22ª of the mixer to the central passage 20ª thereof and thence to the expansion chamber 23, which communicates with the tip.

In Fig. 5, is shown a modification of the invention which contemplates the use of a tip in which the gases are mixed. In this form of the invention, the oxygen tube 5 communicates with the inclined passage 14ª of the head 9ª, said passage communicating at its lower end with the chamber 15ª, which communicates through the plurality of longitudinal passages 18ª with the upper chamber 17ª, said chamber communicating with the upper end of the tip 16ª.

The acetylene tube 6 communicates with the inclined passage 12ª in the head, said passage terminating in the annular chamber 12$^b$ which communicates with the central passage 21ª of the tip, as by the passage 19$^b$, the gases being mixed within the tip after the oxygen has been carried around the head and directed into the upper end of the tip.

In Fig. 6 the invention is shown applied to an injector type of torch. The oxygen in this case is passed down through the passage 14$^b$ to the chamber 15$^b$, which surrounds the tip 16$^b$ and thence upward through the plurality of passages 18$^b$ to the chamber 17$^b$ which communicates with the injector nozzle 24 which extends into the enlarged chamber 25 to which the acetylene is admitted through the passage 12$^b$.

The oxygen passing from the injector nozzle into the tip will carry the acetylene into the central passage 21$^b$ of the tip, the mixed gases expanding in the enlarged portion 21$^c$ of said tip passage, and then being carried through the restricted end portion of said tip to the flame.

It will be obvious that the invention is applicable to any usual form of tip and mixer construction, and by preheating the oxygen before passing it into the mixing chamber, less oxygen is required for the flame and the possibility of oxidizing the metal is reduced to a minimum. With this construction, a very soft and well proportioned flame is produced, which is easy to handle and which produces soft and ductile welds.

I claim:—

A torch of the character described, including a head, a mixing chamber in the head, a tip communicating with the mixing chamber, a chamber in the lower portion of the head encircling the tip, means for admitting oxygen to said lower chamber, a chamber in the upper portion of the head communicating with the mixing chamber, longitudinal passages connecting said upper and lower chambers, and means for admitting acetylene to the mixing chamber.

MELVILLE F. SCHWORM.